(12) United States Patent
Yada et al.

(10) Patent No.: US 9,464,955 B2
(45) Date of Patent: Oct. 11, 2016

(54) STRUCTURE FOR USE WITH FLUID DIAPHRAGM

(71) Applicant: HORIBA STEC, Co., Ltd., Kyoto-shi, Kyoto (JP)

(72) Inventors: Hidetaka Yada, Kyoto (JP); Sotaro Kishida, Kyoto (JP); Takehisa Hataita, Kyoto (JP)

(73) Assignee: HORIBA STEC, Co. Ltd., Kyoto-shi (JP)

( * ) Notice: Subject to any disclaimer, the term of this patent is extended or adjusted under 35 U.S.C. 154(b) by 156 days.

(21) Appl. No.: 14/183,414

(22) Filed: Feb. 18, 2014

(65) Prior Publication Data

US 2014/0230559 A1   Aug. 21, 2014

(30) Foreign Application Priority Data

Feb. 19, 2013   (JP) .................................. 2013-029683

(51) Int. Cl.
| | |
|---|---|
| *G01L 7/08* | (2006.01) |
| *G01L 19/00* | (2006.01) |
| *G01L 7/00* | (2006.01) |
| *G01F 1/38* | (2006.01) |

(52) U.S. Cl.
CPC ............. *G01L 19/0023* (2013.01); *G01L 7/08* (2013.01); *G01F 1/38* (2013.01); *G01L 7/00* (2013.01); *G01L 7/082* (2013.01)

(58) Field of Classification Search
CPC ...... G01L 7/00; G01L 7/082; G01L 19/0645
USPC .................................................... 73/715, 700
See application file for complete search history.

(56) References Cited

U.S. PATENT DOCUMENTS

| | | | | |
|---|---|---|---|---|
| 3,818,765 A | * | 6/1974 | Eriksen ................ | A61B 5/0215 600/488 |
| 7,703,329 B2 | * | 4/2010 | Sekine .................. | G01L 9/0073 73/754 |
| 2006/0144151 A1 | * | 7/2006 | Krause et al. ........ | G01L 9/0027 73/715 |

FOREIGN PATENT DOCUMENTS

JP   2002156299 A   5/2002

\* cited by examiner

*Primary Examiner* — Lisa Caputo
*Assistant Examiner* — Nathaniel T Woodward
(74) *Attorney, Agent, or Firm* — Alleman Hall McCoy Russell & Tuttle LLP

(57) ABSTRACT

A structure comprising: a base; a diaphragm; a peripheral wall member of which one end surface is attached to a circumferential edge part of the diaphragm and the other end surface is attached on the top surface of the base to form an internal space together with the base and the diaphragm; a protruding part that protrudes from the top surface of the base; and a communicatively connecting path that extends from a bottom surface side of the base toward the diaphragm, and communicatively connects the internal space and the outside to each other to flow fluid, wherein on an outer lateral surface of the protruding part, an opening is formed in a part intersecting with an inner lateral surface of the communicatively connecting path, and a part of a fore end inner surface of the communicatively connecting path is formed in the protruding part.

7 Claims, 7 Drawing Sheets

STRUCTURE FOR USE WITH FLUID DIAPHRAGM

TECHNICAL FIELD

The present invention relates to a structure using a diaphragm that is displaced by pressure of fluid.

BACKGROUND ART

Among structures of this sort, there is one that guides fluid to a pressure receiving surface of a diaphragm to detect a displacement of the diaphragm, and converts the displacement into pressure to measure the pressure of the fluid.

Such a structure is also used to measure the pressure of a liquid containing air bubbles, and therefore as described in Patent Literature 1, a flow type structure is known that makes air bubbles less likely to accumulate by flowing fluid in from a first flow path vertical to a diaphragm, and flowing the fluid out from a second flow path, which branches from the first flow path.

Meanwhile, in this structure, the fluid flowing through the first flow path vertically hits against the diaphragm such that the diaphragm may be bent by the kinetic energy of the fluid beyond a bent level caused by the pressure of the fluid, and therefore a measurement error may occur.

For this reason, to develop the present invention, the present inventor has designed an intermediate structure that is, as illustrated in FIG. 3, provided with a base, a diaphragm, and an internal space formed between the base and the diaphragm, and is also provided with: a protruding part that protrudes from the base toward the internal space; a first flow path that extends from a bottom surface side of the base toward the diaphragm; and a second flow path that is formed from a fore end part of the first flow path orthogonally to the first flow path, and opens on an outer lateral surface of the protruding part.

According to such a configuration, fluid is introduced into the internal space from the opening formed on the outer lateral surface of the protruding part, and flows toward a peripheral wall of the internal space, and therefore the fluid can be prevented from vertically hitting against the diaphragm.

However, in order to form the above-described flow paths, a step of forming the flow paths in two directions, i.e., a vertical direction vertical to the diaphragm and a horizontal direction orthogonal to the vertical direction, is required, and therefore working hours and processing cost for the step are incurred.

CITATION LIST

Patent Literature

Patent Literature 1: JP-A2002-156299

SUMMARY OF INVENTION

Technical Problem

Therefore, the present invention is made in order to solve the above-described problems at once, and a main intended object thereof is to make it possible to ensure measurement accuracy even while reducing working hours and processing cost.

Solution to Problem

A structure according to the present invention is provided with: a base that has a top surface and a bottom surface; a diaphragm that is displaced by pressure of a fluid; a peripheral wall member of which one end surface is attached to a circumferential edge part of the diaphragm and the other end surface is attached on the top surface of the base to form an internal space filled with the fluid together with the base and the diaphragm; a protruding part that protrudes from the top surface of the base; and a communicatively connecting path that extends from a bottom surface side of the base toward the diaphragm, and communicatively connects the internal space and the outside to each other to flow the fluid, wherein on an outer lateral surface of the protruding part, an opening is formed in a part intersecting with an inner lateral surface of the communicatively connecting path, and a part of a fore end inner surface of the communicatively connecting path is formed in the protruding part.

If so, the communicatively connecting path can be formed from the bottom surface of the base toward the diaphragm in one processing step by, for example, drilling, and therefore working hours and processing cost can be reduced.

In addition, the opening of the communicatively connecting path on the internal space side is formed on the outer lateral surface of the base, which does not face to the diaphragm, so that the fluid introduced into the internal space from the opening does not flow toward the diaphragm, but mainly flows toward a lateral side, i.e., toward the peripheral wall member. In particular, the fore end inner surface of the communicatively connecting path significantly changes a flow direction of the fluid to form a flow toward the lateral side, so that the fluid flowing out of the opening on the internal space side is involved in the lateral flow, and therefore the entire fluid flows toward the lateral side. That is, the fluid flowing through the communicatively connecting path toward the diaphragm changes the flow direction near the opening, which is an exit of the fluid, and is ejected toward the peripheral wall member present on the lateral side. As described, the flow vertically flowing toward the diaphragm is blocked, and therefore a bend of the diaphragm due to a factor other than the pressure of the fluid can be reduced to ensure measurement accuracy.

In order to easily form the communicatively connecting path by drilling, preferably, the fore end inner surface of the communicatively connecting path tilts with respect to an extending direction of the communicatively connecting path.

Even in the case where the fluid is liquid containing air bubbles, in order to flow the fluid such that the air bubbles do not accumulate in the internal space, preferably, at least two communicatively connecting paths are formed.

Specific embodiments of the communicatively connecting path include an embodiment in which the communicatively connecting path is formed from the bottom surface of the base toward the internal space vertically to the bottom surface.

Specific embodiments for facilitating manufacturing include an embodiment in which: the top surface of the base is a flat surface formed in a circular shape; and the protruding part is a part that protrudes vertically from the top surface of the base and is formed in a columnar shape such that a central axis passes through the center of the top surface.

Advantageous Effects of Invention

According to the present invention configured as described, because the communicatively connecting path can be formed from the bottom surface of the base toward the diaphragm in one processing step by, for example, drilling, working hours and processing cost can be reduced, and in addition, because the fluid flowing into the internal space from the communicatively connecting path hardly flows toward the diaphragm, a bend of the diaphragm, which is caused by a flow velocity, can also be reduced to ensure measurement accuracy.

DESCRIPTION OF EMBODIMENTS

In the following, one embodiment of the present invention is described with reference to drawings.

A structure 100 of the present embodiment is one that is used for a flow rate control device of a flowmeter, and guides fluid to a pressure receiving surface of a diaphragm 1, then detects a displacement of the diaphragm 1 displaced by pressure of the fluid, and converts the displacement into pressure to measure the pressure of the fluid.

Various methods are possible for detecting the displacement of the diaphragm 1; however, the present embodiment employs a method that uses, for example, an unillustrated piezo element attached on a back surface of the pressure receiving surface of the diaphragm 1 to detect the displacement. Besides this, a method that uses, for example, an electrostatic capacitance type sensor or the like to detect the displacement is also possible.

Figure 1:
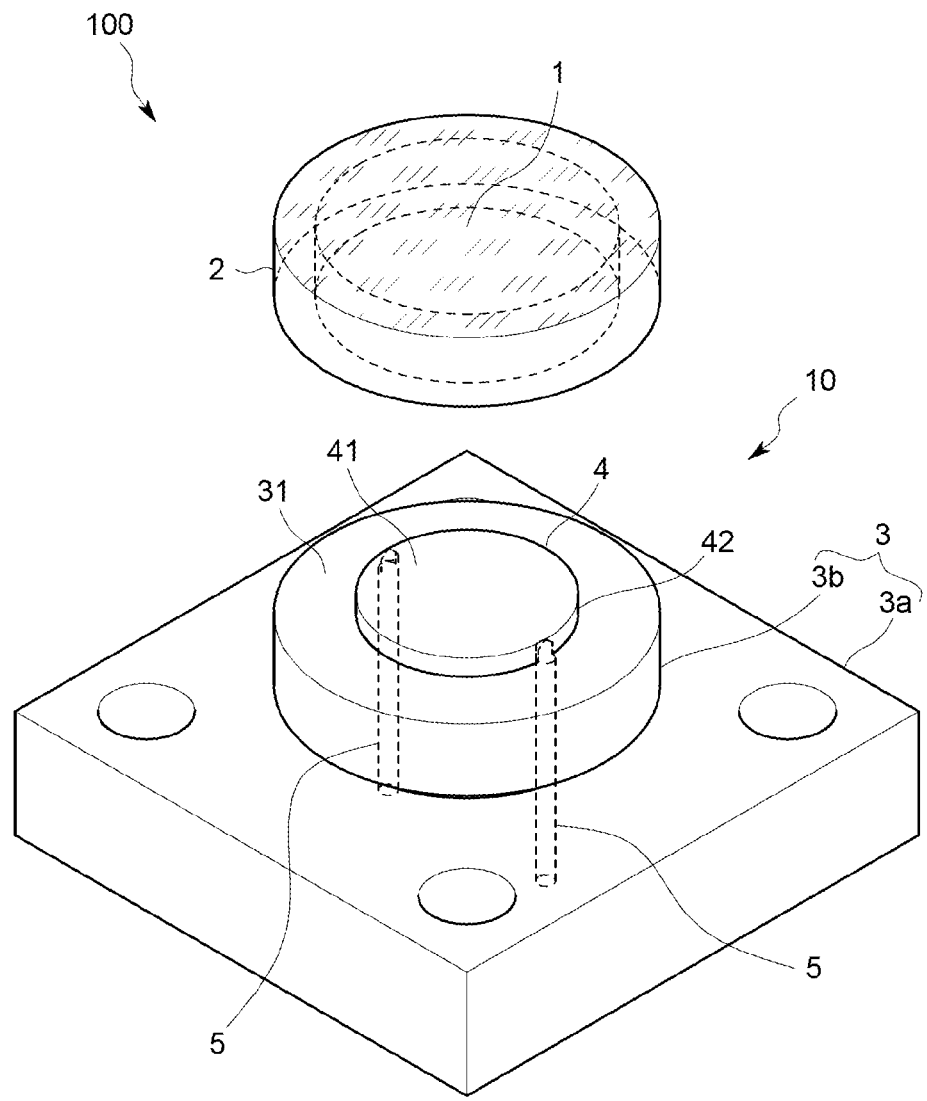
FIG. 1 is an overall perspective view of a structure in one embodiment of the present invention.
Figure 2:
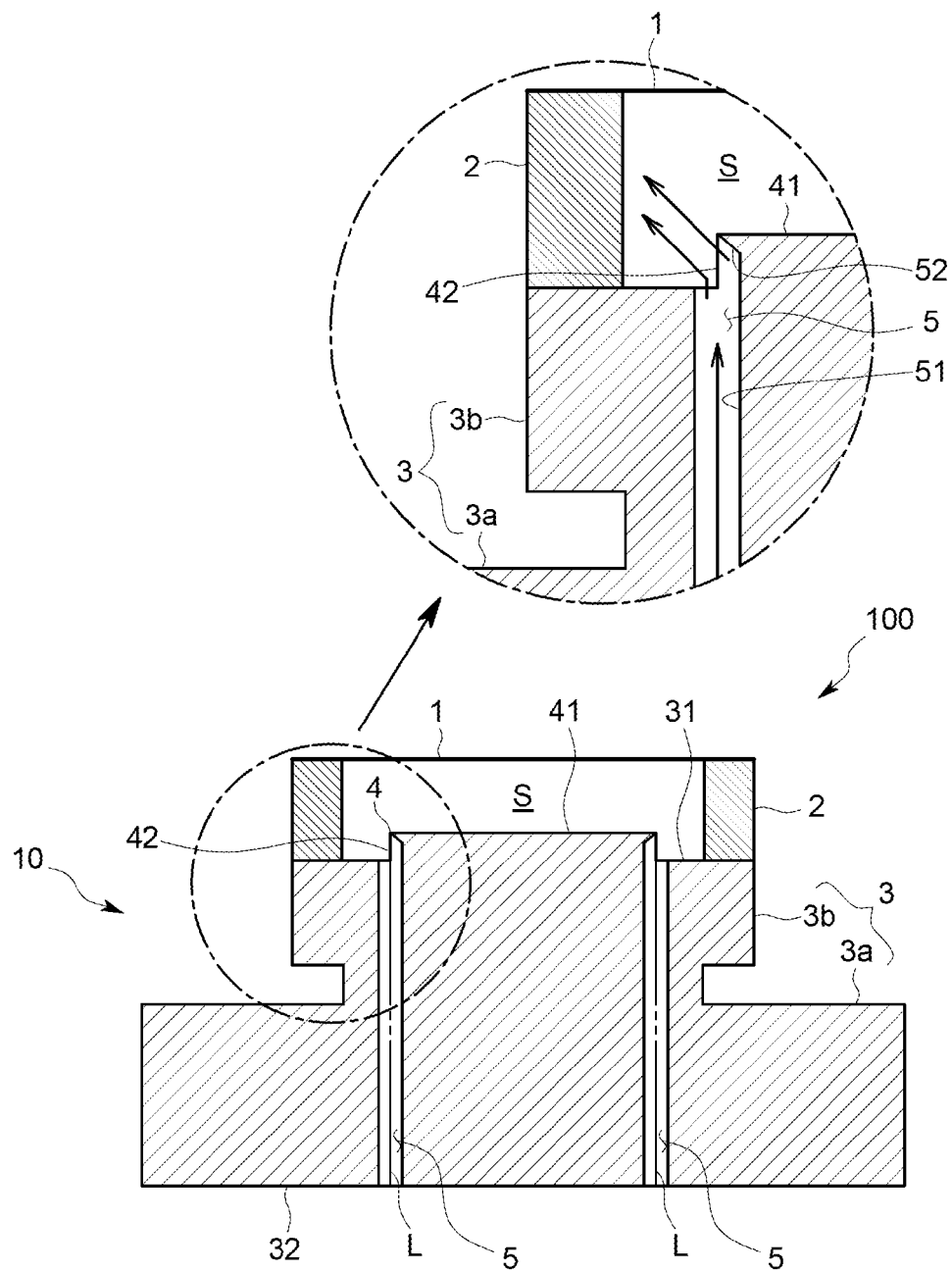
FIG. 2 is a cross-sectional view of the structure in the same embodiment.
Figure 3:
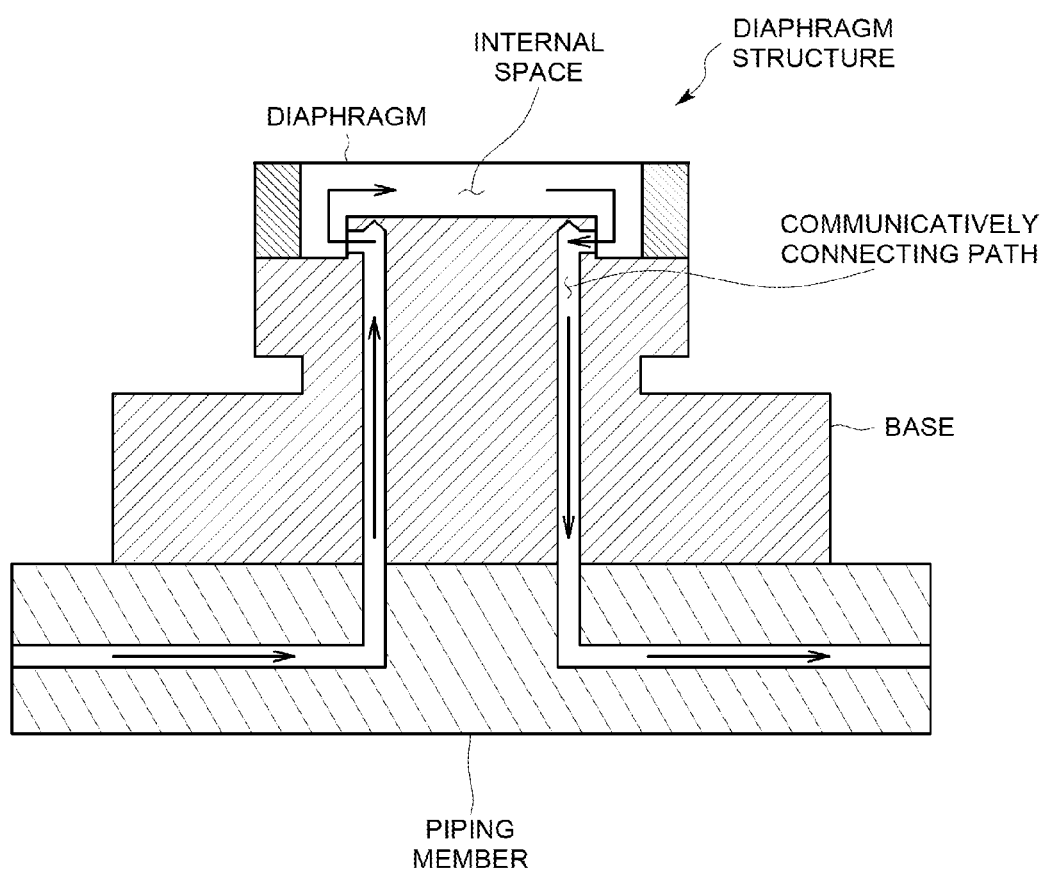
FIG. 3 is a cross-sectional view illustrating a structure that is designed as an intermediate.

Specifically, the structure 100 is, as illustrated in FIGS. 1 and 2, configured to include: a base 3; the diaphragm 1; and a peripheral wall member 2 that vertically extends downward from a circumferential edge part of the diaphragm 1.

The base 3 is a complex shaped base of which a bottom surface side half is a rectangular block part 3a and a top surface side half is a columnar block part 3b, and a bottom surface 32 thereof is attached to an unillustrated blockish piping member.

The diaphragm 1 is a metallic diaphragm formed in, for example, a thin disk shape.

The peripheral wall member 2 is a member that is formed in a cylindrical shape having the same outside diameter as an outside diameter of the diaphragm 1. One end surface of the peripheral wall member 2 is joined to an outer edge of the diaphragm 1 on the pressure receiving surface side, whereas the other end surface is joined to a top surface of the columnar block part 3b, i.e., the top surface 31 of the base 3, and the peripheral wall member 2 is, as illustrated in FIG. 2, configured to, together with the base 3 and the diaphragm 1, form an internal space S filled with the fluid.

In a state where the internal space S is formed, the top surface 31 of the base 3 is provided in parallel with the diaphragm 1 such that it faces the diaphragm 1. The top surface 31 of the base 3 is formed in a circular shape having the same outside diameter as the outside diameter of the diaphragm 1, and from the central part thereof, a columnar protruding part 4 vertically protruding toward the diaphragm 1 is formed integrally with the base 3.

To more specifically describe the protruding part 4, the protruding part 4 is formed in the columnar shape having a smaller diameter than that of the top surface 31 of the base 3, and also formed such that a central axis thereof passes through the center of the top surface 31. A fore end surface 41 of the protruding part 4 is formed in parallel with the top surface 31 of the base 3, and an outer lateral surface 42 vertically rises from the top surface 31 of the base 3. The top surface 31, together with the outer lateral surface 42 and the peripheral wall member 2, forms an annular space constituting part of the internal space S.

In order to guide the fluid into the annular space to fill the internal space S with the fluid, one opening is formed on the above-described outer lateral surface 42 of the protruding part 4, whereas the other opening is formed on the bottom surface 32 of the base 3, and a communicatively connecting path 5 that communicatively connects the internal space S and the unillustrated piping member is formed from the base 3 to the protruding part 4.

The communicatively connecting path 5 is one that vertically extends from the bottom surface 32 of the base 3 toward the diaphragm 1, is and formed in a columnar shape of substantially uniform cross section such that a central axis L thereof comes into contact with the outer lateral surface 42 of the protruding part 4.

More specifically, the opening of the communicatively connecting path 5 on the unillustrated piping member side is formed in a circular shape on the bottom surface 32 of the base 3, and an inner lateral surface 51 of the communicatively connecting path 5 vertically extends from an opening edge on the piping member side toward the diaphragm 1. The opening of the communicatively connecting path 5 on the internal space S side is, in particular, as illustrated in an enlarged view of FIG. 2, formed from the outer lateral surface 42 of the protruding part 4 to the top surface 31 of the base 3 with the above-described inner lateral surface 51 of the communicatively connecting path 5 intersecting with the outer lateral surface 42 of the protruding part 4.

Further, the communicatively connecting path 5 is formed without penetrating through the protruding part 4, and a part of a fore end inner surface 52 of the communicatively connecting path 5 is formed in the protruding part 4. The fore end inner surface 52 is one that is formed continuously from the inner lateral surface 51, and also formed in a conical shape of which a diameter is decreased from the inner lateral surface 51 toward a fore end. The part of the fore end inner surface 52 is formed in the protruding part 4, and a shape thereof is a partially conical shape formed by cutting the conical shape with the outer lateral surface 42 of the protruding part 4, which passes through a tip of the conical shape.

In the present embodiment, two communicatively connecting paths 5 as described above are provided in positions symmetric with respect to the central axis of the protruding part 4, and respectively formed by drilling.

The drilling starts from the bottom surface 32 of the base 3, and moves toward the diaphragm vertically from the bottom surface 32 such that the central axis L comes into contact with the outer lateral surface 42 of the protruding part 4. Then, after a tip of a drill has reached the top surface 31 of the base 3, and before the tip reaches the fore end surface 41 of the protruding part 4, the drilling ends on the outer lateral surface 42 of the protruding part 4.

By performing the drilling in this manner, each of the communicatively connecting paths 5 and the part of the fore end inner surface 52 are formed in the protruding part 4 as described above.

The drill used in the present embodiment is one that is formed in, for example, a conical shape of which a diameter of a fore end part is decreased toward the tip, and therefore the part of the fore end inner surface 52 formed in the protruding part 4 is, as described above, formed in the partially conical shape formed by cutting the conical shape with the outer lateral surface 42 of the protruding part 4.

As has been described above, the diaphragm 1 and the peripheral wall member 2 vertically extending downward from the circumferential edge part of the diaphragm 1 are attached on the top surface 31 of the base 3, and the base 3, protruding part 4, and communicatively connecting paths 5 serve as a diaphragm supporting member 10 that supports the diaphragm 1 and the peripheral wall member 2.

In the structure 100 according to the present embodiment configured as described above, each of the communicatively connecting paths 5 can be formed in one processing step by, for example, the drilling as described above, and therefore working hours and processing cost can be reduced.

In addition, the opening of one of the communicatively connecting paths 5 on the internal space S side is formed on the outer lateral surface 42 of the base 3, which is vertical to the diaphragm 1, and therefore the fluid introduced into the internal space S from the opening flows mainly toward the peripheral wall member 2. In particular, the fore end inner surface 52 of the communicatively connecting path 5 is formed in the partially conical shape with tilting with respect to the diaphragm 1, which significantly changes a flow direction of the fluid to form a flow toward a lateral side, so that the fluid flowing out of the opening on the internal space S side is involved in the lateral flow, and therefore the entire fluid flows toward the lateral side.

That is, the fluid flowing through the communicatively connecting path 5 toward the diaphragm 1 changes a direction of the flow near the opening, which is an exit of the fluid, and is ejected toward the peripheral wall member 2 present on the lateral side.

Accordingly, the flow vertically flowing toward the diaphragm 1 is blocked, and therefore a bend of the diaphragm 1 due to a factor other than pressure of the fluid can also be reduced to ensure measurement accuracy.

Further, the two communicatively connecting paths 5 are provided so that the fluid can be flowed in the internal space S, and therefore the fluid is unlikely to accumulate.

From this, in the case where the fluid is a liquid containing air bubbles, the air bubbles are unlikely to accumulate in the internal space S, and in the case where the fluid is a gas, the gas is unlikely to accumulate in the internal space S, so that purging is facilitated.

Regarding the purging, the protruding part 4 is formed in the internal space S so that the volume of the internal space S is reduced, and therefore it is possible to complete the purging in a short period of time.

The protruding part 4 is one that is formed in the columnar shape such that the central axis thereof passes through the center of the top surface 31 of the base 3, and formed as an object integrated with the base 3, and therefore the protruding part 4 can be easily manufactured.

Note that the present invention is not limited to the above-described embodiment.

Figure 4:
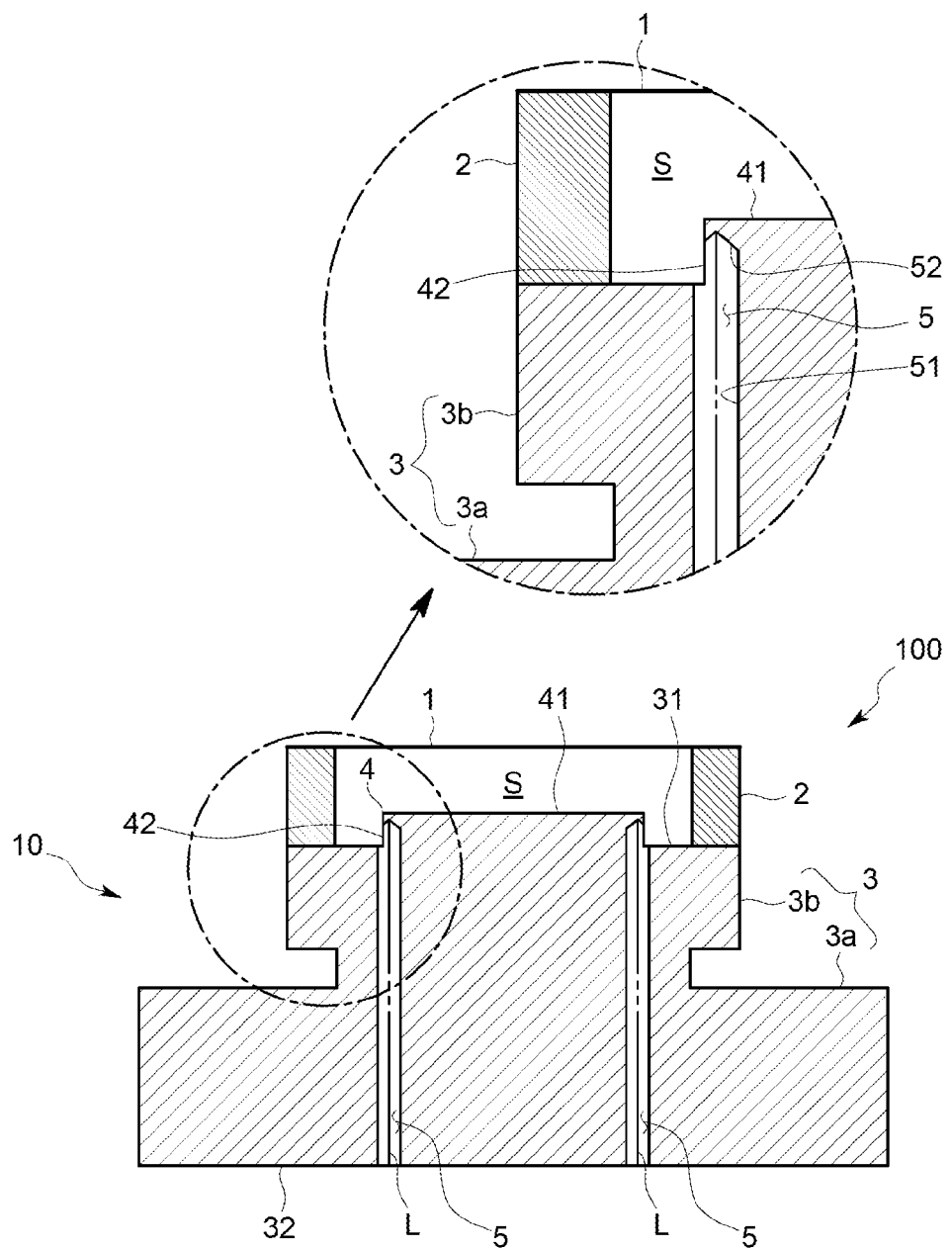
FIG. 4 is a cross-sectional view illustrating a structure in a variation.
Figure 5:
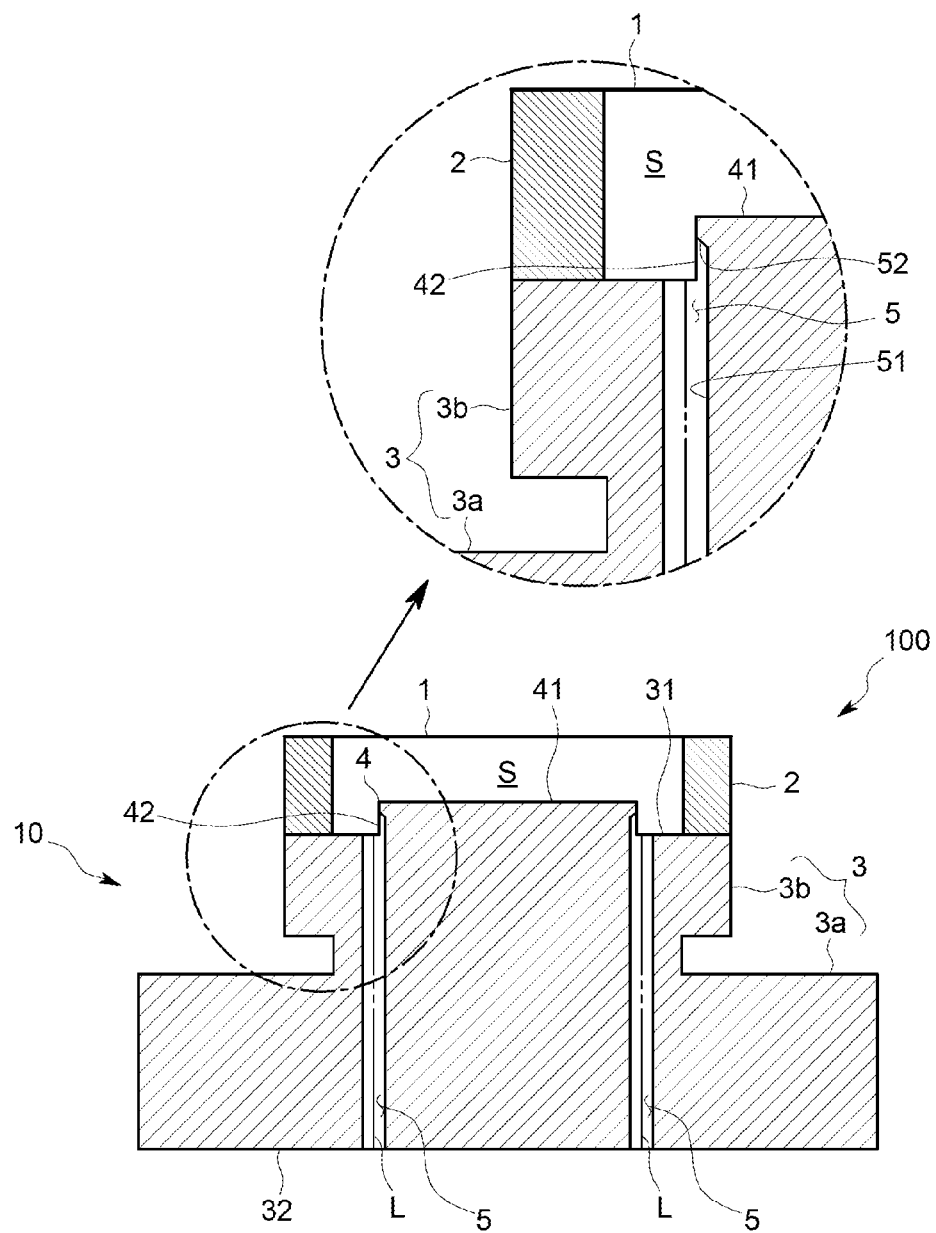
FIG. 5 is a cross-sectional view illustrating a structure in another variation.

For example, in the above-described embodiment, the central axis L of each of the communicatively connecting paths 5 is in contact with the outer lateral surface 42 of the protruding part 4; however, the central axis L is not necessarily required to be in contact with the outer lateral surface 42, but as illustrated in FIG. 4 or 5, may be displaced inward or outward from the outer lateral surface 42 by an amount less than or equal to a radius of the communicatively connecting path 5.

Also, in the above-described embodiment, the outer lateral surface 42 is formed so as to rise vertically from the top surface 31 of the base 3; however, the outer lateral surface 42 may be formed with tilting with respect to the top surface 31.

Figure 6:
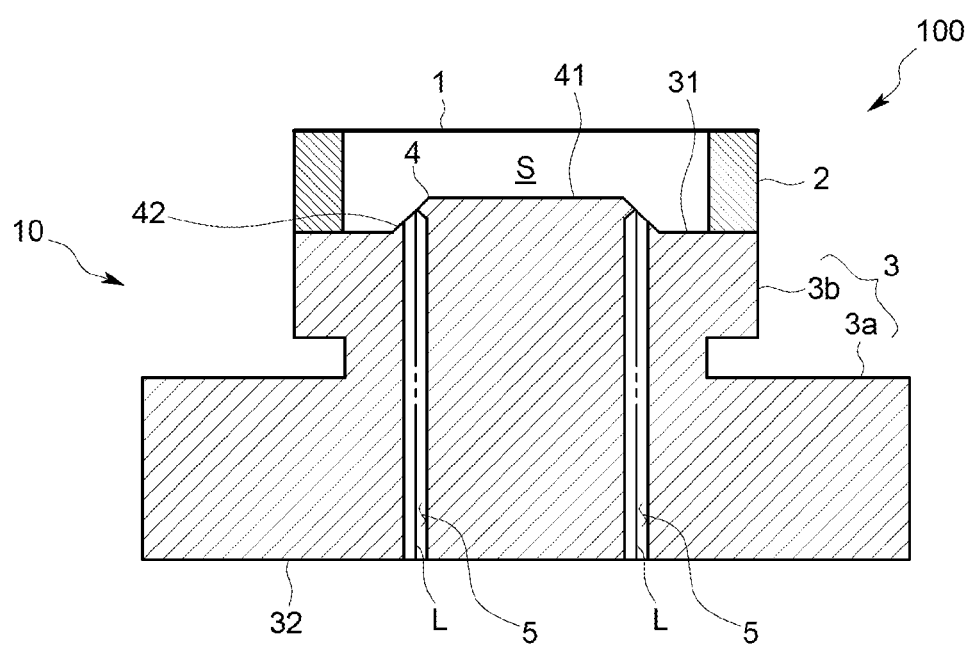
FIG. 6 is a cross-sectional view illustrating a structure in still another variation.

In this case, in order for the part of the fore end inner surface 52 of each of the communicatively connecting paths 5 to be formed in the protruding part 4, as illustrated in FIG. 6, it is only necessary that the communicatively connecting path 5 is formed so as not to penetrate through the outer lateral surface 42.

Figure 7:
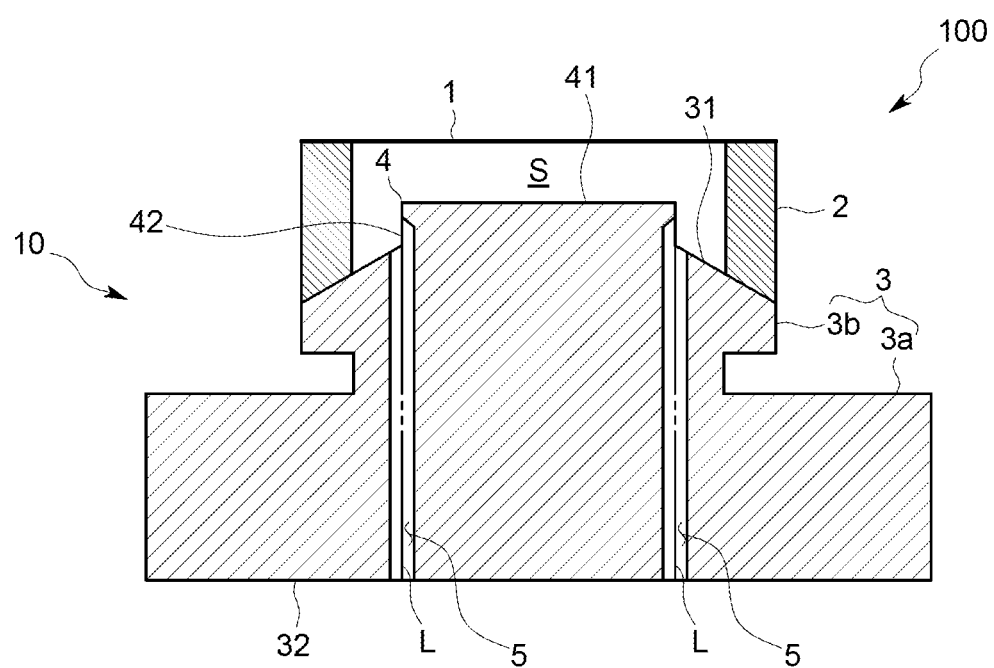
FIG. 7 is a cross-sectional view illustrating a structure in yet another variation.

In the above-described embodiment, the top surface 31 of the base 3 is provided in parallel with the diaphragm 1; however, as illustrated in FIG. 7, the top surface 31 may be provided so as to tilt with respect to the diaphragm 1.

Also, in the above-described embodiment, the communicatively connecting paths 5 extend vertically from the bottom surface 32 of the base 3; however, the communicatively connecting paths 5 may extend from the bottom surface 32 toward the diaphragm 1 with tilting.

Further, the shape of the fore end inner surface 52 of each of the communicatively connecting paths 5 is not required to be the partially conical shape described in the above-described embodiment, and the fore end inner surface 52 may be formed to constitute a part of a rectangular shape or a spherical shape.

In the above-described embodiment, the communicatively connecting paths 5 are formed from the base 3 to protruding part 4 by drilling; however, the communicatively connecting paths 5 may be formed by casting.

Also, in the above-described embodiment, the structure 100 is used to measure the pressure of the fluid; however, the structure 100 may be used as an actuator or a strain gauge.

The present invention is not limited to any of the above-described embodiments, but can be variously modified without departing from the scope thereof.

REFERENCE CHARACTER LIST

100: Structure
1: Diaphragm
2: Peripheral wall member
3: Base
31: Top surface
32: Bottom surface
4: Protruding part
41: Fore end surface
42: Outer lateral surface
5: Communicatively connecting path
51: Inner lateral surface
52: Fore end inner surface
S: Internal space

The invention claimed is:
1. A structure comprising:
a base that has a top surface and a bottom surface;
a diaphragm that is displaced by pressure of a fluid;
a peripheral wall member of which one end surface is attached to a circumferential edge part of the diaphragm and the other end surface is attached on the top surface of the base to form an internal space filled with the fluid together with the base and the diaphragm;

a protruding part that is formed integrally with the base, an outer lateral surface of which protrudes upwardly from the top surface of the base; and a communicatively connecting path that extends from a bottom surface side of the base toward the diaphragm, and communicatively connects the internal space and an outside to each other to flow the fluid, wherein on the outer lateral surface of the protruding part, an opening is formed in a part intersecting with an inner lateral surface of the communicatively connecting path, and a part of a fore end inner surface of the communicatively connecting path is formed in the protruding part, and a fore end of a portion of the communicatively connecting path on a side of the top surface of the base is opened toward the diaphragm.

2. The structure according to claim 1, wherein the fore end inner surface of the communicatively connecting path tilts with respect to an extending direction of the communicatively connecting path.

3. The structure according to claim 1, wherein at least two communicatively connecting paths are formed.

4. The structure according to claim 1, wherein the communicatively connecting path is formed from the bottom surface of the base toward the internal space vertically to the bottom surface.

5. The structure according to claim 1, wherein:
the top surface of the base is a flat surface formed in a circular shape; and
the protruding part is a part that protrudes vertically from the top surface of the base and is formed in a columnar shape such that a central axis passes through a center of the top surface.

6. The structure according to claim 1, wherein:
a shape of the fore end inner surface is a partially conical shape formed by cutting the conical shape with the outer lateral surface of the protruding part.

7. A diaphragm supporting member attached with: a diaphragm that is displaced by pressure of a fluid; and a peripheral wall member of which one end surface is attached to a circumferential edge part of the diaphragm, the diaphragm supporting member comprising:

a base that is adapted to have a top surface and a bottom surface and on the top surface, attached with the other end surface of the peripheral wall member to form an internal space filled with the fluid together with the diaphragm and the peripheral wall member;

a protruding part that is formed integrally with the base, an outer lateral surface of which protrudes upwardly from the top surface of the base; and a communicatively connecting path that extends from a bottom surface side of the base toward the diaphragm and communicatively connects the internal space and an outside to each other to flow the fluid, wherein on the outer lateral surface of the protruding part, an opening is formed in a part intersecting with an inner lateral surface of the communicatively connecting path, and a part of a fore end inner surface of the communicatively connecting path is formed in the protruding part, and a fore end of a portion of the communicatively connecting path on a side of the top surface of the base is opened toward the diaphragm.

* * * * *